US012525419B2

(12) United States Patent
Riedo

(10) Patent No.: US 12,525,419 B2
(45) Date of Patent: Jan. 13, 2026

(54) X-RAY TUBE AND ASSOCIATED MANUFACTURING PROCESS

(71) Applicant: COMET HOLDING AG

(72) Inventor: Adrian Riedo, Dudingen (CH)

(73) Assignee: COMET HOLDING AG, Flamatt (CH)

( * ) Notice: Subject to any disclaimer, the term of this patent is extended or adjusted under 35 U.S.C. 154(b) by 0 days.

(21) Appl. No.: 18/036,762

(22) PCT Filed: Nov. 19, 2021

(86) PCT No.: PCT/EP2021/082343
§ 371 (c)(1),
(2) Date: May 12, 2023

(87) PCT Pub. No.: WO2023/088565
PCT Pub. Date: May 25, 2023

(65) Prior Publication Data

US 2024/0347307 A1 Oct. 17, 2024

(51) Int. Cl.
*H01J 35/06* (2006.01)
*H01J 35/20* (2006.01)

(52) U.S. Cl.
CPC ............ *H01J 35/064* (2019.05); *H01J 35/20* (2013.01)

(58) Field of Classification Search
CPC ................................ H01J 35/064; H01J 35/20
See application file for complete search history.

(56) References Cited

U.S. PATENT DOCUMENTS 5,170,422 A * 12/1992 Fiebiger ................ H01J 35/064 378/138
10,573,481 B1 2/2020 Katsap
(Continued)

FOREIGN PATENT DOCUMENTS

CN 212 874 415 U 4/2021
DE 40 26 300 A1 2/1992
(Continued)

OTHER PUBLICATIONS

International Search Report (Aug. 10, 2022) for corresponding International App. PCT/EP2021/082343.
(Continued)

*Primary Examiner* — Chih-Cheng Kao
(74) *Attorney, Agent, or Firm* — Alston & Bird LLP

(57) ABSTRACT

An X-ray tube includes a vacuum-sealed tube housing evacuated to a pressure of $10^{-7}$ mbar or lower, a cathode assembly inside the housing including an electron emitter adapted to emit electrons when heated at a temperature included in a defined working temperature range and at least one component containing carbon in an amount of at least 20% by weight, especially at least 30% by weight, even more especially at least 50% by weight, the at least one component being preferably designed for holding the emitter, and an anode assembly inside the housing including a target layer for receiving electrons emitted by the electron emitter, wherein the electron emitter preferably includes boride, preferably lanthanum hexaboride ($LaB_6$), and wherein the cathode assembly is designed such that if the emitter temperature is included in the working temperature range.

23 Claims, 2 Drawing Sheets

(56) References Cited

U.S. PATENT DOCUMENTS

| | | | | |
|---|---|---|---|---|
| 2009/0256135 | A1 | 10/2009 | Xiao et al. | |
| 2014/0097736 | A1 | 4/2014 | Katsap | |
| 2016/0358740 | A1* | 12/2016 | Hu | H01J 35/065 |
| 2020/0273656 | A1 | 8/2020 | Hansen et al. | |

FOREIGN PATENT DOCUMENTS

| | | | |
|---|---|---|---|
| JP | S49 127562 | A | 12/1974 |
| JP | 2001 084931 | A | 3/2001 |

OTHER PUBLICATIONS

Rolf Behling Ed—Behling et al: “Chapter 6: Diagnostic X-Ray Sources from the Inside”, Modern Diagnostic X-Ray Sources, Taylor & Francis Group, pp. 177-308 Jan. 1, 2016 (Jan. 1, 2016), XP009525580, ISBN: 978-1-4822-4132-7 Retrieved from the Internet: URL:https://ebookcentral.proquest.com/lib/ epo-ebooks/detail.action?dociD=2075866 [retrieved on May 26, 2015].

Marshall A L et al: “Carbon Vapor Pressure and Heat of Vaporization”, Journal of the American Chemical Society, vol. 72, No. 5, May 1, 1950 (May 1, 1950), pp. 2166-2171, XP055947412, DOI: 10.1021/ja01161a081 Retrieved from the Internet: URL:https://pubs.acs.org/doi/pdf/10.1021/j a01161a081> fig. 3 and related text.

* cited by examiner

X-RAY TUBE AND ASSOCIATED MANUFACTURING PROCESS

BACKGROUND AND SUMMARY

The present invention relates to the technical field of X-ray tubes. The present invention relates in particular to an X-ray tube comprising a vacuum-sealed tube housing and a cathode assembly inside the housing with an electron emitter comprising boride, especially lanthanum hexaboride, adapted to emit electrons when heated at a temperature comprised in a defined working temperature range. The present invention also concerns a manufacturing process for such an X-ray tube as well as the use of such an X-ray tube for creating X-rays.

X-rays tubes are widely used for various industrial and medical applications. Such irradiation systems find application in diagnostic systems or with therapeutic systems for irradiation of diseased tissue, but are also employed e.g., for sterilization of substances such as blood or foodstuffs. Other areas of application are to be further found in classical X-ray technology such as for instance X-raying pieces of luggage and/or transport containers, or non-destructive testing of workpieces, for instance concrete reinforcements, etc.

X-ray tubes typically possess an electron generating part, called the cathode head or cathode assembly, and an X-ray generating part called the anode assembly.

During operation, the electrons generated at the cathode assembly are accelerated by a high electric field towards the X-ray tube target layer of the anode assembly onto which they eventually impinge. The loss of kinetic energy of the electrons due to their interaction with the atoms of target layer material results in the generation of X-ray radiation. Depending on the material of the target layer, X-rays with different energies can be generated.

An X-ray tube comprises a housing having a surface defining an interior chamber and the cathode and anode assemblies are included inside said chamber. The pressure inside said chamber is less than atmospheric pressure, usually less than $10^{-6}$ mbar.

The tube may be sealed, i.e., it is pumped out during manufacturing and sealed off from the environment. This type of tube is referred to as a "closed tube" or "vacuum-sealed" in the following specification.

Another type of tube is a so-called opened tube which includes vacuum-pumping elements, such as positive displacement vacuum pumps or getter pumps, and where, at least during operation of the electron generating part, such vacuum-pumping elements reduce and/or maintain the pressure inside the chamber to less than atmospheric pressure.

Also, the cathode assemblies may be of different types:

The conventional cathode assembly is a so-called hot cathode assembly comprising a thermionic emitter whose operational temperature is very high, usually comprised between 1000 and 2500 degrees Celsius depending on the material it is made of, for example tungsten, thorium-added tungsten, or lanthanum hexaboride. Usually, the electron emitter material is supported by a supporting material that is heated by resistive losses of an electric current flowing through the supporting material to emit hot, or thermionic, electrons. Since thermionic emitters in such hot cathode assemblies reach very high temperatures (electron emitters made of lanthanum hexaboride must ideally have an operating temperature around 1760 K) the surrounding parts, such as its supporting elements, must also be designed to bear such high temperatures. Materials having high melting points, such as carbon, are therefore used in such hot cathode assemblies.

A different type of cathode assembly is the so-called cold cathode assembly which comprises a cold emitter also called field emitter, working following the principle of field emission: the electrical field at the emitter surface is so high that electrons are emitted at ambient temperature, hence the "cold" designation. A typical example of cold cathode assembly comprises carbon nano tubes bundled together to form the emitter or a sharp tungsten needle.

The present invention concerns, according to an aspect thereof, X-ray tubes including a cathode assembly of the above-described conventional hot type, and more specifically on such tubes provided with a hot cathode assembly whose electron emitter material comprises boride, preferably lanthanum hexaboride ($LaB_6$), which material has proven to be particularly efficient in the emission of electrons. $LaB_6$ is ideal for many small spot size applications such as scanning or transmission electron microscopy, surface analysis and metrology, and for high current applications such as microwave tubes, lithography, electron-beam welders, X-ray sources and free electron lasers. The unique properties of $LaB_6$ provide stable electron-emitting media with work functions near 2.65 eV. The low work function yields higher currents at lower cathode temperatures than tungsten, which means greater brightness and longer cathode life.

Since thermionic emitters in such hot cathode assemblies reach very high temperatures (electron emitters made of lanthanum hexaboride must ideally have an operating temperature around 1760 K) the surrounding parts, such as its supporting elements, must also be designed to bear such high temperatures. Unfortunately, hot cathode assemblies including an $LaB_6$ emitter have never proven to work in sealed X-ray tubes for an extended period of time and were, until now, exclusively used in opened tubes.

The Applicant has now found out why such cathode assemblies react differently in closed and opened X-ray tubes and identified a solution to make them work sustainably in closed tubes. It is therefore desirable to provide for a vacuum-sealed X-ray tube and a corresponding manufacturing method allowing for the use of electron emitters comprising boride, preferably lanthanum hexaboride ($LaB_6$).

According to an aspect of the present invention, an X-ray tube is provided comprising a vacuum-sealed tube housing evacuated to a pressure of $10^{-7}$ mbar or lower, a cathode assembly inside the housing comprising an electron emitter adapted to emit electrons when heated at a temperature comprised in a defined working temperature range and at least one component containing carbon in an amount of at least 20% by weight, especially at least 30% by weight, even more especially at least 50% by weight, the at least one component being preferably designed for holding the emitter, an anode assembly inside the housing comprising a target layer for receiving electrons emitted by the electron emitter, wherein the electron emitter preferably comprises boride, preferably lanthanum hexaboride, and wherein the cathode assembly is designed such that if the emitter temperature is comprised in the working temperature range, the partial vapor pressure of carbon inside the housing, especially the partial vapor pressure of the carbon contained in the at least one component, remains less than $10^{-4}$ mbar, preferably less than $10^{-5}$ mbar, still more preferably less than $10^{-6}$ mbar.

The Applicant has identified the key issue explaining the above-mentioned difference in use of hot cathode assemblies with an emitter comprising boride, especially $LaB_6$, and at least one component comprising carbon in opened and closed X-Ray tubes. It is important to note here, that by the term "vacuum-sealed tube housing", it is meant a housing which is in no fluid connection with the outside of the housing, in particular through a pump. The key issue is the presence, due to the continuous pumping by means of positive displacement pumps, of a remaining amount of oxygen inside opened tubes, compared to the very low content of residual oxygen inside closed (sealed) tubes, which oxygen comes into action when the emitter comprising boride, especially $LaB_6$, and the component containing carbon reach high temperatures. Moreover, open systems do not have such a low partial $O_2$ pressure as closed systems and therefor there is more $O_2$ left in the system. Even systems that are closed but use polymer parts (e.g. O-rings) to seal the tube housing have more $O_2$ left in them than systems that only use materials that can withstand high bake-out temperatures such as metals and ceramic materials. Moreover, e.g. O-rings cannot withstand temperatures higher than around 450 K which is not enough to reach a deep vacuum.

In order for the electrons to be emitted, a thermionic emitter comprising boride, especially lanthanum hexaboride ($LaB_6$), needs to be heated to a temperature higher than a minimum working temperature of around 1760 K. The at least one carbon-containing component of the cathode assembly is also heated, either by resistive heating if that component carries the emitter or by thermal contact if that component is another component of the cathode assembly.

The at least one component reaches due to thermal losses usually a temperature at least equal and usually higher than that of the emitter. This temperature depends on the geometry of each cathode assembly, the heat conductivity and the radiant energy of the material it is made of.

Considering the fact that the interior of the tube has a pressure less than the atmospheric pressure, for example around $10^{-7}$ or $10^{-8}$ mbar, carbon contained in the at least one component starts to enter into gaseous phase in a significative manner when its partial vapor pressure reaches a threshold of $10^{-6}$ mbar.

In opened tubes or tubes with much remaining oxygen, when the at least one component reaches high temperatures and the above-mentioned threshold, carbon and oxygen present in the gas phase react inside the tube to form $CO_2$, which $CO_2$ is then evacuated by the action of the vacuum-pumping elements or getter pumps and so does not interfere with emission of electrons.

In a vacuum-sealed or closed tube, as indicated hereabove, the content of residual oxygen inside the tube is very low. When the temperature of the component containing carbon gets too high and carbon is released in the gaseous phase, the latter cannot combine with oxygen which is absent from the tube contrary to what happens in an opened tube. Here, carbon reacts with boride, especially lanthanum hexaboride ($LaB_6$), according to relationship (1) hereunder to form borcarbide and lanthancarbide, which are not highly volatile but have a higher work function as $LaB_6$. Layers of borcarbide and lanthancarbide accumulate on the $LaB_6$ emitter and, after a certain period of time, hinder the emission of electrons, hence the malfunction of the tube.

$$2LaB_6+7C\rightarrow 3B_4C+2LaC_2 \quad (1)$$

The X-ray tube according to the invention is configured to avoid the above malfunction: the cathode assembly is designed such that if the emitter temperature is comprised in the working temperature range, the partial vapor pressure of carbon inside the housing, especially the partial vapor pressure of the carbon contained in the at least one component, remains less than $10^{-4}$ mbar, preferably less than $10^{-5}$ mbar, still more preferably less than $10^{-6}$ mbar, in order to avoid that carbon is present in the gaseous phase and reacts with boride, especially $LaB_6$. Important to note is that the tube is configured such that it does not comprise any pump for maintaining the vacuum level inside the tube sufficiently low.

As an example, the at least one component is made of or comprises at least one allotrope of carbon, for example graphite or pyrolytic graphite.

In a first preferred embodiment of the present invention, the at least one component is holding the emitter. This is advantageous since components comprising carbon are particularly well adapted to support emitter comprising boride, especially $LaB_6$.

In another preferred embodiment of the present invention, the vacuum-sealed tube housing is sealed using materials suitable for bake-out temperatures higher than 470K, advantageously higher than 520K, even more advantageously higher than 570K, preferably the vacuum-sealed tube housing is sealed using exclusively these materials. With such high temperature baking of the vacuum-sealed tube housing, it is possible to avoid using any pump such as a positive displacement pump, a titanium pump, an ion getter pump, or a non-evaporable getter pump to maintain a vacuum level inside the vacuum-sealed tube low enough for allowing a stable emission of electrons for an extended period of time.

In a further preferred embodiment of the present invention, the vacuum-sealed tube housing comprises metal, advantageously stainless steel, Kovar, nickel, tungsten or copper, and ceramic. With this, the vacuum-sealed tube is made of materials that allow for reaching a vacuum level which is sufficiently low to avoid using any pump for maintaining a stable electron emission for an extended period of time.

In a further preferred embodiment of the present invention, the vacuum-sealed tube housing is sealed with metal parts, advantageously stainless steel, Kovar, nickel, tungsten or copper, and or ceramic parts, preferably exclusively with metal parts, advantageously stainless steel, Kovar, nickel, tungsten or copper, and or ceramic parts. With these materials, the vacuum-sealed tube is made of materials that allow for reaching and sealing a vacuum level which is sufficiently low to avoid using any pump for maintaining a stable electron emission for an extended period of time.

In another preferred embodiment of the present invention, the vacuum-sealed tube housing has been sealed after being baked-out at a temperature higher than 470K, advantageously higher than 520K, even more advantageously higher than 570K. This allows for reaching a lower vacuum level inside the vacuum-sealed housing.

In yet another preferred embodiment, the partial pressure of oxygen, especially molecular oxygen, inside the housing is less than $1\cdot10^{-8}$ mbar, preferably less than $5\cdot10^{-9}$ mbar, after the bake-out and pumping procedure.

In a further preferred embodiment, the X-ray tube, especially the vacuum-sealed tube housing, comprises a crimped pump tube, especially a copper crimped pump tube. This allows for easily separating the X-ray tube to any pump after bake-out.

In yet a further preferred embodiment, the diameter of the electron emitter is larger than 100 μm, preferably larger than 150 μm, advantageously larger than 200 μm, even more advantageously larger than 300 μm. This allows for having an emitter with a high brightness. Furthermore, the cathode assembly, especially the electron emitter and the electrically conductive supporting base, are advantageously designed to emit an electron current between 0.1 mA to 5 mA.

In another preferred embodiment of the present invention, the working temperature range is 1400 K to 2100 K, advantageously 1500 K to 1800 K.

In yet another preferred embodiment of the present invention, the at least one component is in the form of an elongated portion protruding towards the anode assembly, said elongated portion extends in a longitudinal direction between a first end at which it is fixed and a second free end, and the electron emitter is located at said second free end. With the elongated portion, it is possible to form an electron source with a limited size and therefore to increase the efficiency of the X-ray tube.

In yet another preferred embodiment of the present invention, the elongated portion is so configured that an electrical current flowing in the cathode assembly flows along the elongated portion in a forward current supporting portion, in the longitudinal direction, towards the second free end thereof and back towards its first end in a backward current supporting portion, the forward and backward current supporting portions preferably being designed such to keep the partial vapor pressure of carbon inside the housing, especially the partial vapor pressure of the carbon contained in the at least one component, less than $10^{-4}$ mbar, preferably less than $10^{-5}$ mbar, still more preferably less than $10^{-6}$ mbar In a further preferred embodiment, the elongated portion comprises an electrical insulating layer or a gap delimiting two electrically conductive paths joined at their end, preferably at a position adjacent to the electron emitter. With this, it is possible to heat the emitter to a temperature comprised in the working temperature range while ensuring that the temperature of the at least one component is close to the temperature of the emitter. Since electrons are emitted from an emitter comprising boride at a temperature much lower than a temperature which would result in a partial pressure of carbon inside the housing of $10^{-6}$ mbar or more, the reaction of the gaseous carbon and the boride of the emitter is avoided.

In another preferred embodiment of the present invention, the emitter is embedded in the elongated portion and the electron emitting surface of the emitter preferably comprises a flat emitting surface facing the target layer, wherein the flat emitting surface is preferably coplanar with the second free end of the elongated portion.

In a further preferred embodiment of the present invention, the X-ray tube comprises an electrical power supply adapted to deliver an electrical current to the cathode assembly for heating the emitter, the power supply preferably being configured to deliver electrical power so that during operation the emitter temperature is comprised in the working temperature range.

In yet another preferred embodiment of the present invention, the electron emitter is supported by an electrically conductive supporting base including the at least one component, wherein the electrically conductive supporting base is designed for resistively heating the emitter, and wherein the electron emitter and the electrically conductive supporting base are designed such that at a temperature of the emitter comprised in the working temperature range, the partial vapor pressure of the carbon contained in the at least one component remains less than $10^{-4}$ mbar, preferably less than $10^{-5}$ mbar, still more preferably less than $10^{-6}$ mbar.

In a further preferred embodiment of the present invention, the electrically conductive supporting base is operationally connected to the electrical power supply to deliver electrical current to the conductive supporting base.

In another preferred embodiment of the present invention, the cathode assembly, especially the electron emitter and the electrically conductive supporting base, are designed such that with an electrical heating current comprised between 0.5 A and 3 A, preferably comprised between 1 A and 2 A, the emitter temperature is comprised in the working temperature range.

In yet another preferred embodiment of the present invention, the cathode assembly, especially the electron emitter and the electrically conductive supporting base, are configured so that the temperature of the at least one component is as close as possible from the temperature of the electron emitter, when the emitter temperature is comprised in the working temperature range. Since electrons are emitted from an emitter comprising boride at a temperature much lower than a temperature which would result in a partial pressure of carbon inside the housing greater than $10^{-6}$ mbar, the reaction of the gaseous carbon and the boride of the emitter is avoided.

In a further preferred embodiment of the present invention, the cathode assembly, especially the electron emitter and the electrically conductive supporting base, are designed such that the temperature difference between the at least one component and the electron emitter is less than 300 K, preferably less than 150K, advantageously less than 100 K, when the emitter temperature is comprised in the working temperature range.

In yet a further preferred embodiment of the present invention, the cathode assembly, especially the electron emitter and the electrically conductive supporting base, are designed such that the temperature of the at least one component is less than 2500 K, advantageously less than 2300 K, especially less than 2100 K, when the emitter temperature is comprised in the working temperature range.

In a second aspect a method is provided for manufacturing an X-ray tube according to the present invention, comprising the steps of:

a. providing for cathode assembly inside a housing, the cathode assembly comprising an electron emitter adapted to emit electrons when heated at a temperature comprised in a defined working temperature range and at least one component containing carbon in an amount of at least 20% by weight, especially at least 30% by weight, even more especially at least 50% by weight, the at least one component being preferably designed for holding the emitter, the electron emitter comprising boride, preferably lanthanum hexaboride ($LaB_6$),
b. providing for an anode assembly inside the housing comprising a target layer for receiving electrons emitted by the electron emitter,
c. evacuating the housing,
d. baking-out the X-ray tube at a temperature sufficient to reach a partial pressure of oxygen inside the housing less than $10^{-8}$ mbar, wherein the X-ray tube is advantageously baked-out at a temperature of at least 470K,
e. sealing the housing.

In a first preferred embodiment of the second aspect of the present invention, the housing is sealed by closing, preferably by crimping, a pumping tube, advantageously a copper pumping tube, through which the housing is evacuated.

In a third aspect, an X-ray tube according to the present invention is used for creating X-rays wherein the electron emitter is heated to reach a temperature comprised in a defined working temperature range for emitting electrons towards the anode assembly and wherein the partial vapor pressure of carbon inside the housing, especially the partial vapor pressure of the carbon contained in the at least one component, is kept lower that $10^{-4}$ mbar, preferably lower than $10^{-5}$ mbar, still more preferably lower than $10^{-6}$ mbar.

It is to be understood that the different embodiments mentioned hereabove can be realized singly or in any combinations. In particular, the aforementioned technical features and those to be explained in the following can be used not only in the combinations indicated, but also in other combinations or alone, without departing from the scope of the present invention.

BRIEF DESCRIPTION OF THE DRAWINGS

The invention will now be explained in more details with reference to particular and non-limitative embodiments of the invention. The figures depict, in a simplified, not-to-scale representation, schematic views of X-rays tubes or parts thereof, according to these particular embodiments of the invention:

FIG. 1 schematically illustrates an X-ray tube 100 according to an embodiment of the present invention.

DETAILED DESCRIPTION

Figure 1:
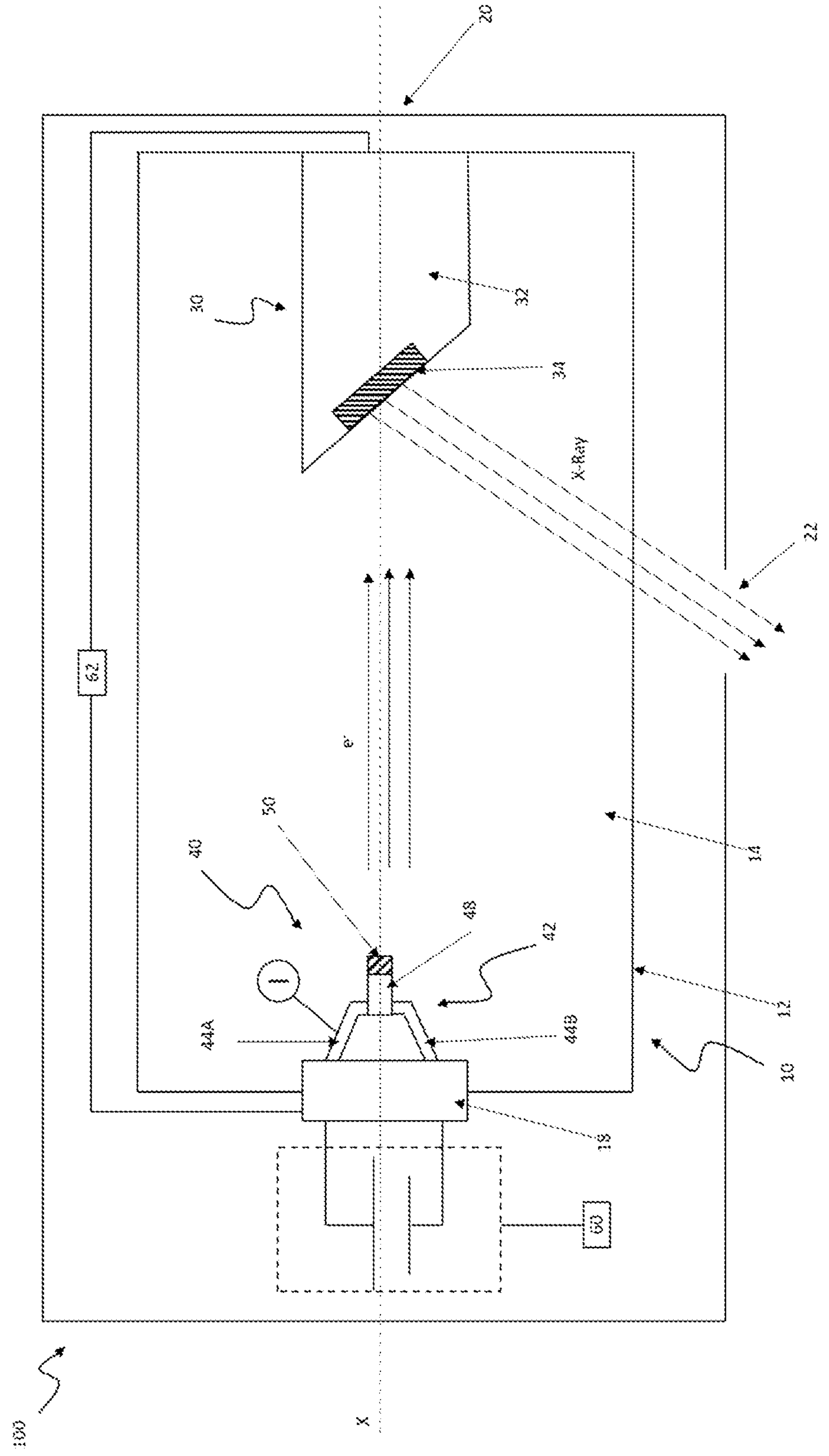
FIG. 1 is an overall schematic view of an X-ray tube according to an embodiment of the present invention.

In a conventional manner, the X-ray tube 100 comprises a vacuum-sealed tube 10 typically formed of a cylinder 12 (often a glass or a metal cylinder) of axis X, pumped out so as to define an evacuated internal chamber 14. The pressure inside the tube is typically around $10^{-7}$ or $10^{-8}$ mbar, and the tube is advantageously baked-out to reach a partial pressure of oxygen lower than $10^{-8}$ mbar. The tube 10 itself may be enclosed by a metal enclosure 20 provided with a window 22 through which X-ray radiation issuing from the tube 10 emerges into the outer space.

An anode assembly 30 forming the X-ray generating part and a cathode assembly 40 forming the electron generating part of the X-ray tube 100 are disposed inside the tube 10 opposite each other, as shown along axis X.

The anode assembly 30 is conventionally made of a metal piece electrically biased with respect to the cathode assembly 40 in order to accelerate the electrons to a kinetic energy of several thousands of electron volts. The anode assembly typically comprises a base 32 of high conductive material, for example copper, molybdenum or graphite, and an upper target layer 34 directly facing the cathode 40.

The cathode assembly 40 is a so-called hot type cathode. It comprises an electron thermionic emitter 50 comprises boride, advantageously lanthanum hexaboride ($LaB_6$), and is adapted to emit electrons when heated to an ideal working temperature of around 1760 K.

The thermionic emitter 50 is supported by an electrically conductive supporting base 42 which in the particular context of the present invention includes at least one component including at least 20% carbon in weight.

In the non-limitative illustrated example, more specifically, the electrically conductive supporting base 42 comprises two legs 44A, 44B-made for example of a molybdenum-rhenium alloy or carbon-rigidly fixed in a base 18, for example made of ceramic material, and bent towards the center in an inverted 'V'. Legs 44A, 44B both act as a clamp maintaining, at its distal end, the at least once component containing carbon, which in is this embodiment is in the form of an elongated portion 48 protruding towards the anode assembly.

An electrical power supply 60 supplies an electrical current to the cathode assembly 40 for heating the supporting base 42 and the elongated portion 48 by resistive heating and thus the emitter 50 by heat conductivity.

A separate electrical power supply 62 supplies a high voltage between the anode and cathode assemblies 30, 40 for accelerating electrons which are already out of the electron emitter material towards the target layer 34, as shown in FIG. 1.

The thermionic emitter 50 is heated mostly by heat conductivity through its contact surfaces with the elongated portion 48 and to a lesser extent by heat radiated from said elongated portion 48. Considering heat losses, the temperature of the elongated portion and/or the conductive base has to be higher than the temperature of the emitter 50. According to the invention, the cathode assembly is however designed such that when the emitter temperature is comprised in the working temperature range, the temperature of the components of the cathode assembly containing carbon is low enough to ensure that the partial vapor pressure of carbon inside the housing, especially the partial vapor pressure of the carbon contained in the elongated portion 48, remains less than 104 mbar, preferably less than $10^{-5}$ mbar, still more preferably less than $10^{-6}$ mbar.

Figure 2:
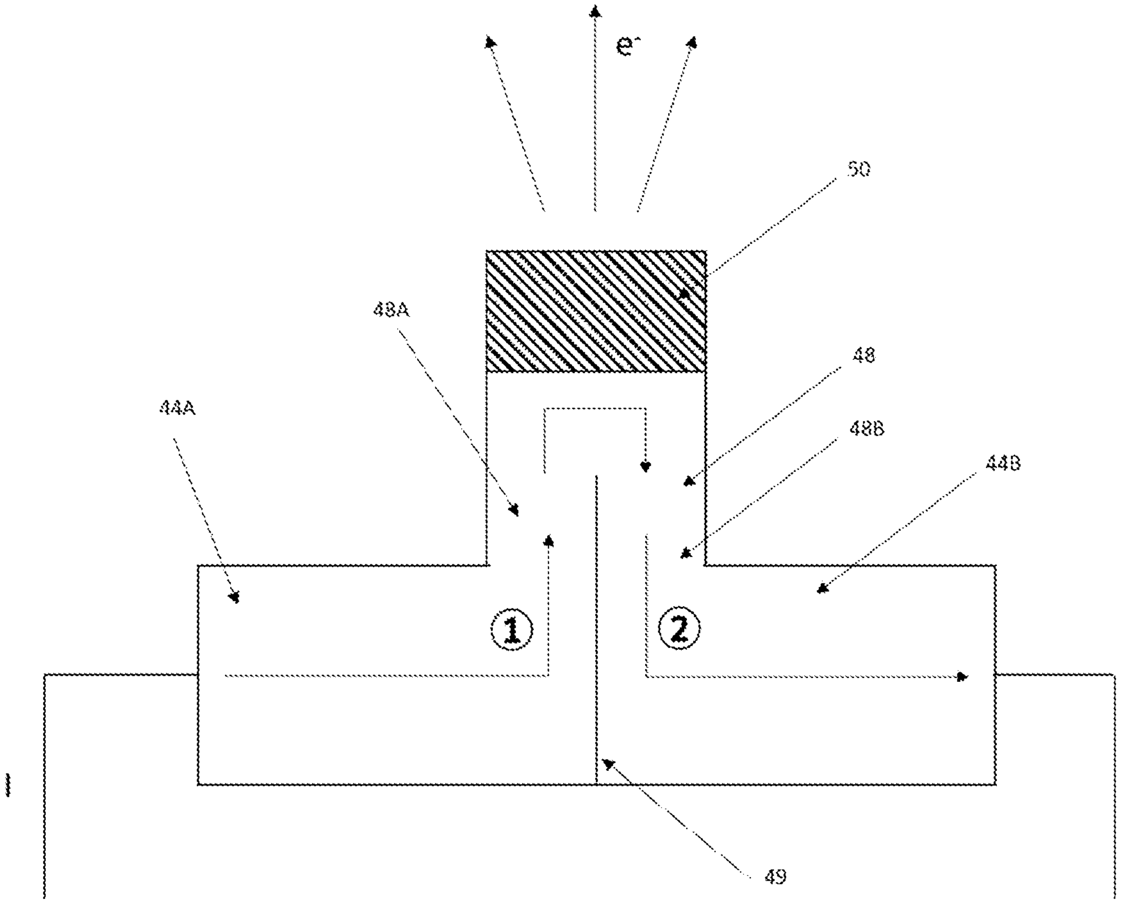
FIG. 2 is a schematic view showing an electron emitter mounted on an elongated portion of the cathode assembly.

FIG. 2 illustrates in more details a possible embodiment for the electrically conductive supporting base 42 comprising the two legs 44A and 44B and the elongated portion 48 on which the emitter 50 is mounted. In this embodiment, the elongated portion comprises an electrical insulating layer 49, or a gap delimiting two electrically conductive paths 1 and 2 joined at their end at a position adjacent to the electron emitter 50. As illustrated by the arrows in this figure, the electrical current I is directed, thanks to the insulating layer 49, towards the emitter 50, allowing for a resistive heating of the elongated portion 48 and thus to a temperature of the elongated portion as close as possible to the temperature of the emitter 50 when the latter is maintained at a temperature in the working temperature range.

The invention claimed is:

1. An X-ray tube comprising:
- a vacuum-sealed tube housing evacuated to a pressure of $10^{-7}$ mbar or lower;
- a cathode assembly inside the housing comprising an electron emitter adapted to emit electrons when heated at a temperature comprised in a defined working temperature range and at least one component containing carbon in an amount of at least 20% by weight, the at least one component being designed for holding the emitter,
- an anode assembly inside the housing comprising a target layer for receiving electrons emitted by the electron emitter,
- wherein the cathode assembly is designed such that, when the emitter temperature is comprised in the working temperature range, the partial vapor pressure of carbon inside the housing remains less than $10^{-4}$ mbar.

2. The X-ray tube according to claim 1, wherein the at least one component is holding the emitter.

3. The X-ray tube according to claim 1, wherein the vacuum-sealed tube housing is sealed using materials suitable for bake out temperatures higher than 470K.

4. The X-ray tube according to claim 3, wherein the vacuum-sealed tube housing comprises metal and ceramic.

5. The X-ray tube according to claim 3, wherein the vacuum-sealed tube housing has been sealed after being baked-out at a temperature higher than 470K.

6. The X-ray tube according to claim 5, wherein the partial pressure of oxygen inside the housing is less than $10^{-8}$ mbar after the bake-out and pumping procedure.

7. The X-ray tube according to claim 5, comprising a crimped pump tube.

8. The X-ray tube according to claim 1, wherein a diameter of the electron emitter is larger than 100 μm.

9. The X-ray tube according to claim 1, wherein the working temperature range is 1400 K to 2100 K.

10. The X-ray tube according to claim 1, wherein the at least one component is in the form of an elongated portion protruding towards the anode assembly, the elongated portion extending in a longitudinal direction between a first end at which the elongated portion is fixed and a second free end, and the electron emitter is located at the second free end.

11. The X-ray tube according to claim 10, wherein the elongated portion is so configured that an electrical current flowing in the cathode assembly flows along the elongated portion in a forward current supporting portion, in the longitudinal direction, towards the second free end thereof and back towards the first end in a backward current supporting portion, the forward and backward current supporting portions being designed such to keep the partial vapor pressure of carbon inside the housing less than $10^{-4}$ mbar.

12. The X-ray tube according to claim 10, wherein the elongated portion comprises an electrical insulating layer or a gap delimiting two electrically conductive paths joined at ends of the two electrically conductive paths.

13. The X-ray tube according to claim 10, wherein the emitter is embedded in the elongated portion and the electron emitting surface of the emitter comprises a flat emitting surface facing the target layer and wherein the flat emitting surface is coplanar with the second free end of the elongated portion.

14. The X-ray tube according to claim 1, comprising an electrical power supply adapted to deliver an electrical current to the cathode assembly for heating the emitter.

15. The X-ray tube according to claim 1, wherein the electron emitter is supported by an electrically conductive supporting base including the at least one component, wherein the electrically conductive supporting base is designed for resistively heating the emitter, and wherein the electron emitter and the electrically conductive supporting base are designed such that at a temperature of the emitter comprised in the working temperature range, the partial vapor pressure of the carbon contained in the at least one component remains less than $10^{-4}$ mbar.

16. The X-ray tube according to claim 15, wherein the electrically conductive supporting base is operationally connected to an electrical power supply to deliver electrical current to the conductive supporting base.

17. The X-ray tube according to claim 15, wherein the cathode assembly is designed such that with an electrical heating current comprised between 0.5 A and 3 A the emitter temperature is comprised in the working temperature range.

18. The X-ray tube according to claim 15, wherein the cathode assembly is configured so that the temperature of the at least one component is as close as possible to the temperature of the electron emitter, when the emitter temperature is comprised in the working temperature range.

19. The X-ray tube according to claim 18, wherein the cathode assembly is designed such that the temperature difference between the at least one component and the electron emitter is less than 300 K when the emitter temperature is comprised in the working temperature range.

20. The X-ray tube according to claim 15, wherein the cathode assembly is designed such that the temperature of the at least one component is less than 2500 K when the emitter temperature is comprised in the working temperature range.

21. Use of an X-ray tube according to claim 1, comprising creating X-rays, heating the electron emitter to reach a temperature comprised in a defined working temperature range for emitting electrons towards the anode assembly, and keeping a partial vapor pressure of carbon inside the housing lower than $10^{-4}$ mbar.

22. The X-ray tube according to claim 1, wherein the emitter comprises boride.

23. The X-ray tube according to claim 1, wherein the emitter comprises tungsten.

* * * * *